United States Patent [19]

Lawson

[11] Patent Number: 4,750,876
[45] Date of Patent: Jun. 14, 1988

[54] GUIDE PIN ASSEMBLIES FOR USE IN MOLD PRESSES

[75] Inventor: John M. Lawson, Scottsdale, Ariz.

[73] Assignee: Motorola Inc., Schaumburg, Ill.

[21] Appl. No.: 100,399

[22] Filed: Sep. 24, 1987

[51] Int. Cl.⁴ .............................................. B29C 43/32
[52] U.S. Cl. ..................................... 425/406; 100/219;
249/160; 249/168; 425/414; 425/468;
425/DIG. 10
[58] Field of Search ............... 100/219, 240, 241, 245;
425/193, 406, 414, 468, DIG. 10; 249/160, 163,
165, 168

[56] References Cited
U.S. PATENT DOCUMENTS
3,081,494 3/1963 Darnell .............................. 249/160

Primary Examiner—Jay H. Woo
Assistant Examiner—Timothy W. Heitbrink
Attorney, Agent, or Firm—Raymond J. Warren

[57] ABSTRACT

A guide pin assembly is described which unidirectional orients mold platens while permitting temperature compensating movement in a perpendicular direction. This is accomplished by using a guide pin and shoe that contact in one direction and permit movement in a perpendicular direction. A bushing containing preloaded bearings is disposed about the guide pin such that the bearings make contact with the shoe to reduce wear and permit the guide pin to slideably contact the shoe.

6 Claims, 2 Drawing Sheets

GUIDE PIN ASSEMBLIES FOR USE IN MOLD PRESSES

BACKGOUND OF THE INVENTION

The present invention relates, in general, to mold presses and, more particularly, to guide pin assemblies for use in mold presses or the like.

Presently, mold presses contain varying kinds of guide pins, also known as die sets. A common factor among these types of guide pins is that they provide total registration, or contact, about the entire circumference. Because of the mismatch between the platens when heated, a great deal of friction results and wear is caused on standard guide pins. This in turn reduces the effectiveness of the guide pins.

As a result, there exists a need for a guide pin assembly that provides alignment of the dies within established tolerances but which will allow partial directed movement to adjust for mismatch caused when the dies are heated.

Accordingly, it is an object of the present invention to provide a guide pin assembly which overcomes the above deficiencies.

A further objective of the present invention is to provide a guide pin assembly which allows adjustment for heat expansion when being engaged and disengaged.

Another object of the present invention is to provide a guide pin assembly which has improved longevity due to reduced frictional contact.

The above and other objects and advantages of the present invention are provided by a guide pin assembly for use with mold presses as described herein.

SUMMARY OF THE INVENTION

A particular embodiment of the present invention comprises a guide pin assembly comprising: a guide pin; a shoe having a pair of raised opposed walls; and a bushing means containing a plurality of bearings, the bushing means slideably disposed about the guide pin such that as the guide pin is inserted into the shoe, the bearings in the bushing will contact the opposed walls. This will unidirectional orient the molding platens while permitting temperature compensating movement in a perpendicular direction.

DETAILED DESCRIPTION OF THE DRAWINGS

Figure 1:
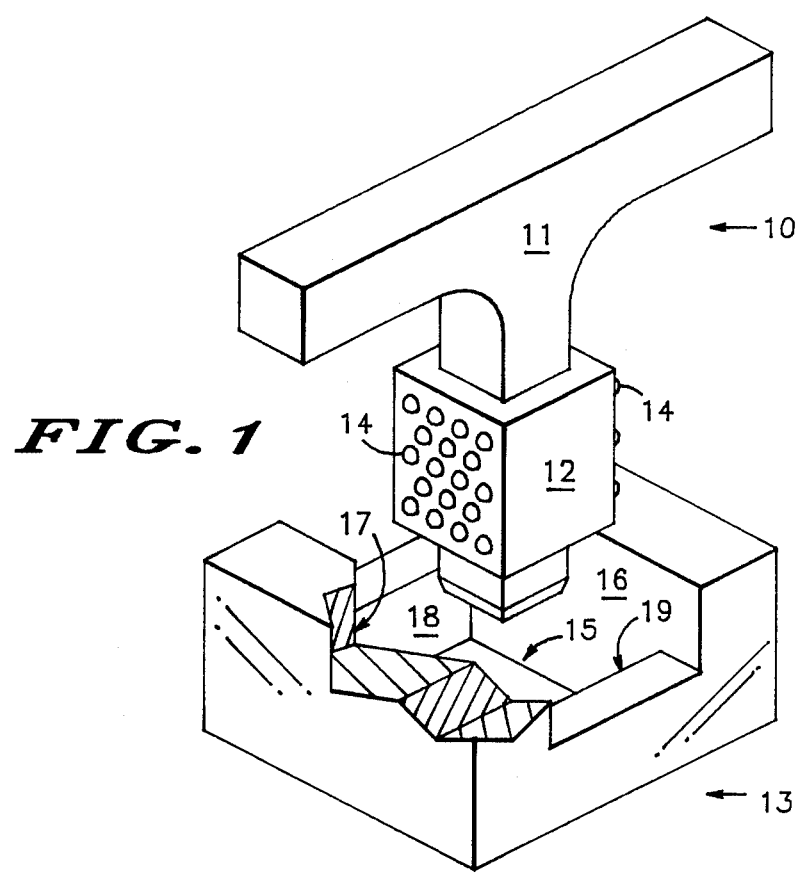
FIG. 1 is a perspective view of a guide pin assembly embodying the present invention.

Referring to FIG. 1, a guide pin assembly, or die set, generally designated 10 is illustrated. Guide pin 10 consists essentially of a guide pin 11, a bushing means 12, and a shoe 13. Bushing 12 contains a plurality of ball bearings 14 preloaded into two opposing faces of busing 13.

In operation, guide pin 11 extends into an opening 15 of shoe 13. Opening 15 is defined by a pair of opposing raised walls 16 and 17, and a pair of low walls 18 and 19. The distance between walls 16 and 17 is set to be approximately 0.001" less than the width of guide pin 11 combined with ball bearings 14. This provides for a tight fit with bushing 12. As bushing 12 extends into opening 15, bushing 12 will hang-up in opening 15 once bearings 14 make contact with walls 16 and 17. At this point, guide pin 11 will push down through bushing 12 causing bearings 14 to rotate against walls 16 and 17 and force bushing 12 further into opening 15.

Figure 2:
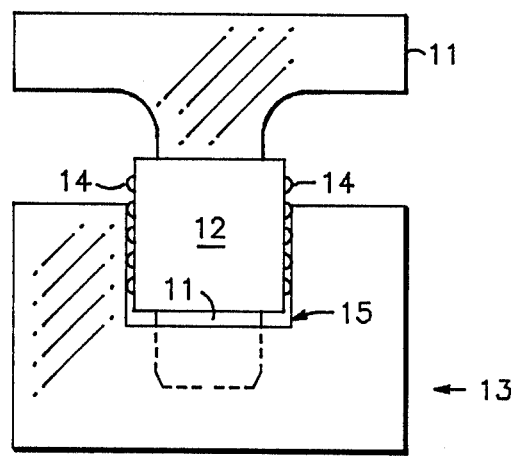
FIG. 2 is a side view of the guide pin assembly of FIG. 1 while engaged.

Referring now to FIG. 2, guide pin assembly 10 is illustrated after being inserted into opening 15. This causes the platens to be unidirectional oriented while permitting temperature movement in a perpendicular direction.

As is illustrated in FIGS. 1 and 2, guide pin assembly 10 provides only partial registration, as opposed to total registration, with foot 13. This partial registration allows for movement of guide pin 11 in one direction (X) while prohibiting movement in a perpendicular direction (Y). This is allowed so as to reduce the wear on guide pin assembly 10 while at the same time keeping the alignment within specifications.

Figure 3:
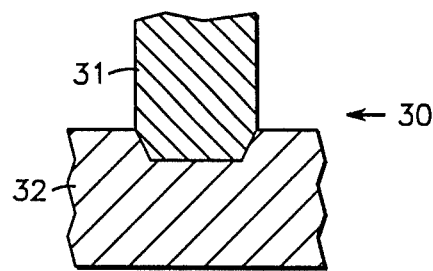
FIG. 3 is a cross-sectional view of a prior art guide pin assembly.

Shown in FIG. 3 is a prior art guide pin assembly, generally designated 30. This consists of a guide pin 31 and a shoe 32. Basically, the end of pin 31 which contacts shoe 32 is conically shaped to fit a mating depression in shoe 32. This type of assembly provides total registration and causes a great deal of wear. The reasons for this will become more apparent with a review of FIG. 4.

Figure 4:
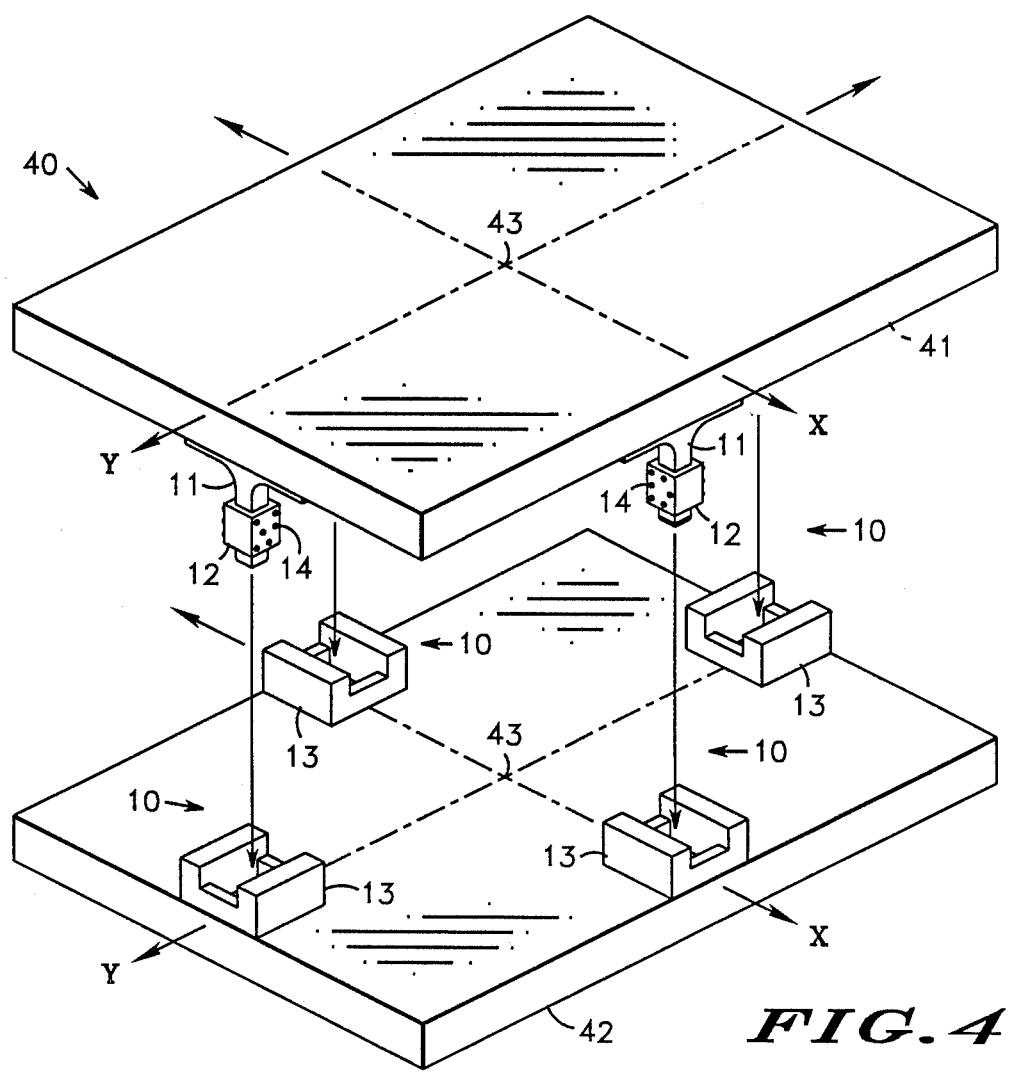
FIG. 4 is a perspective view of a mold press comprising a guide pin assembly embodying the present invention.

In FIG. 4, a mold press, generally designated 40, comprising guide pin assemblies 10 is illustrated. It should be noted that many of the standard portions of mold press 40 known to those of skill in the art have been eliminated for clarity. FIG. 4 illustrates mold press 40 having a pair of mold platens 41 and 42. In operation, mold platens 41 and 42 are heated to temperatures of 370° C. or more which results in thermal expansion of platens 41 and 42 in the X and Y directions, as illustrated by the arrows. Because no two items are exactly alike in their thermal characteristics, platens 41 and 42 will expand in slightly differing amounts, which will be enhanced by the overall size of the platens. The expansion of these platens can be interpreted as being outwardly extending from a centrally located point 43.

As shown in FIG. 4, guide pin assemblies 10 work with platens 41 and 42 to maintain alignment within tolerances while at the same time allowing for thermal expansion. Guide pin assemblies 10 are located at approximately the centers of the sides of platens 41 and 42. By placing assemblies 10 in these locations, only one directional expansions will have to be compensated.

It should be noted that only two assemblies 10 are required: one to align in the Y direction and allow movement in the X direction; and the other to align in the X direction and allow movement in the Y direction. However, in practice it is preferable to have a third assembly, with the same characteristics as the one of original two to assist in an angular alignment of platens 41 and 42.

Thus, it will be apparent to one skilled in the art, after a review of the above specification, that there has been provided in accordance with the invention, a device and method that fully satisfies the objects, aims and advantages set forth above.

While the invention has been described in conjunction with specific embodiments thereof, it will be evident to those skilled in the art that many alterations, modifications, and variations will be apparent to those skilled in the art in light of the foregoing description. Accordingly, it is intended to embrace all such alterations, modifications, and variations in the appended claims.

I claim:

1. A guide pin assembly comprising:
   a guide pin;
   a shoe having a first wall, a second wall opposite said first wall, and a third wall and a fourth wall disposed between said first and second walls, said first and second walls being taller than said third and fourth walls; and
   bushing means containing on opposed sides thereof a plurality of bearings, said bushing means being disposed about said guide pin such that said guide pin is slideably insertable into said shoe, said bearings contacting only said first and second walls of said shoe.

2. The guide pin assembly of claim 1 wherein said guide pin is coupled to a first platen of a molding apparatus.

3. The guide pin assembly of claim 2 wherein said shoe is coupled to a second platen of said molding apparatus.

4. The guide pin assembly of claim 1 wherein said bearings ar preloaded into said bushing.

5. A guide pin assembly comprising:
   a guide pin coupled to a first platen of a molding apparatus;
   a shoe coupled to a second platen of said molding apparatus, said shoe having a first wall, a second wall opposite said first wall, and a third wall and a fourth wall disposed between said first and second walls, said first and second walls being taller than said third and fourth walls; and
   bushing means containing on opposed sides thereof a plurality of bearings, said bushing means being disposed about said guide pin such that said guide pin is slideably insertable into said shoe, said bearings contacting only said first and second walls of said shoe.

6. The guide pin assembly of claim 5 wherein said bearings are preloaded into said bushing.

* * * * *